May 14, 1957     W. H. RIEDEL     2,792,029
DEFOAMER FOR MILK FILLING MACHINES
Filed Sept. 29, 1954

INVENTOR.
WALTER H. RIEDEL
BY *Howard L. Fischer*
ATTORNEY

United States Patent Office 2,792,029
Patented May 14, 1957

2,792,029

DEFOAMER FOR MILK FILLING MACHINES

Walter H. Riedel, St. Paul, Minn.; Marie H. Riedel and First Trust Company of St. Paul, executors of said Walter H. Riedel, deceased Application September 29, 1954, Serial No. 459,186

7 Claims. (Cl. 141—121)

This invention relates to a defoamer for a milk bottle and carton filling machine and is designed to provide means for saving the milk which is drawn off in foam from the top of the bottles by a vacuum of air. Heretofore the foam of the milk drawn off by the vacuum was discharged into a container or can and became wasted milk when the foam condensed back into liquid milk.

I have provided means for drawing off the milk foam and causing the milk to be condensed back into liquid milk which is returned to the filling apparatus of the filling machine without virtually any loss or waste of liquid milk.

My apparatus will remove all of the foam from the top of the cartons, condense the same into liquid milk and transfer the condensed milk back to the bottle or carton filling apparatus of the filling machine. With my defoamer the milk is separated from the air vacuum without being exposed to the outer atmosphere, thus making it unnecessary to have a can or container to catch the milk which has been condensed from the foam removed from the top of the cartons or bottles.

My defoamer is formed in sections so that it may be readily taken apart, washed and sterilized and made ready to re-assemble and apply to the milk filling machine.

While I have shown and described my defoamer as used with a milk filling machine, it is apparent that the same may be used with any filling machine where the liquid is inclined to build up a foam on top of the carton, bottle or container being filled with the liquid. The same principle will be involved in condensing the foam and carrying the liquid directly back to the filling station in any other similar filling machine.

It is also a feature to provide a defoamer wherein a large chamber is provided which is interposed in the vacuum line which causes a sudden reduction in pressure causing the foam entering the enlarged chamber to be suddenly condensed into liquid.

The various features, details and objects will be more fully and clearly hereinafter defined.

In the drawings forming part of this specification:

Figure 1:
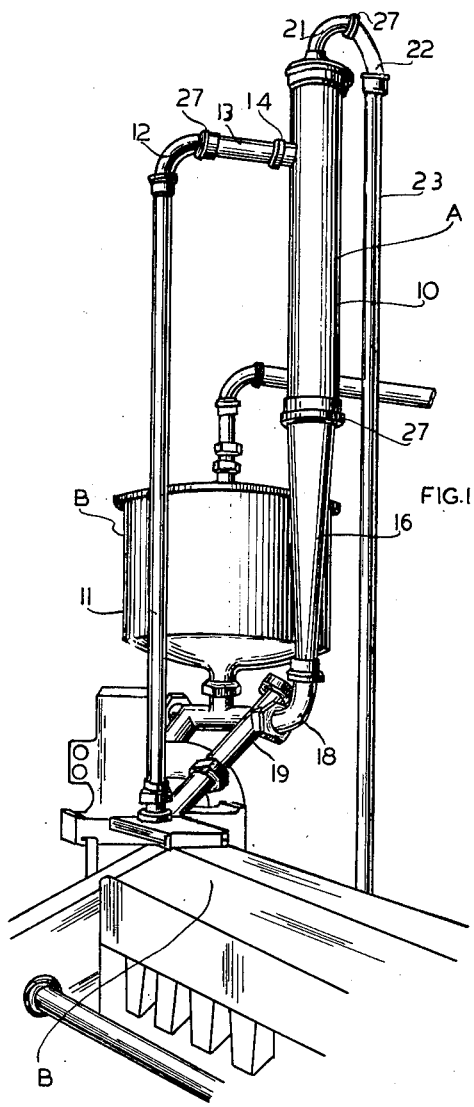
Figure 1 is a perspective view showing my defoamer attached to a milk bottle filling machine, only a portion of the bottle filling machine being illustrated.

I have illustrated my defoamer A in perspective in Figure 1 to show the manner in which the same is connected with the milk bottle filling machine. Only portions of the milk bottle filling machine are illustrated as it is apparent that such a filling machine may be of any suitable character.

A primary feature of my invention is to remove the milk foam, which forms at the top of the bottles being filled with milk, and carry the foam to my large defoaming conduit 10 where the foam is condensed back into liquid milk without exposing the foam or the milk condensed therefrom to the outer atmosphere and delivering the condensed milk back to the filling apparatus so that there is virtually no loss of milk through the foam which forms in the process of filling milk bottles or milk containers passing through the filling machine. Heretofore considerable milk was lost from each filling machine owing to the fact that milk foam was condensed back into a container which was exposed to the outer atmosphere and the condensed milk could not be saved but had to be discarded.

The milk filling machine B is adapted to receive milk bottles or cartons which are passed under the milk filling mechanism which may be of any suitable construction. For convenience I have only illustrated a small portion of the milk filling machine.

Figure 2:
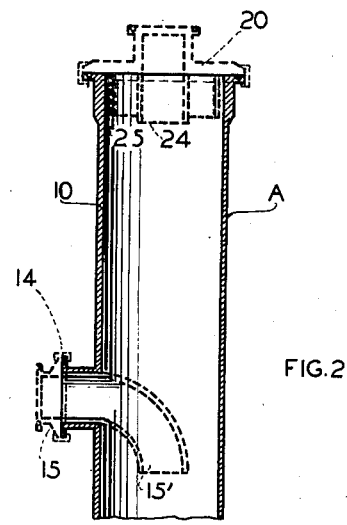
Figure 2 is a vertical cross section of the large defoaming conduit portions of the length of which are broken away.
Figure 3:
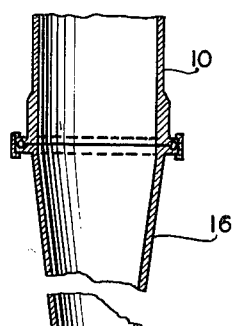
Figure 3 illustrates the top collar which fits on the upper end of the large defoaming conduit, in section.
Figure 3:
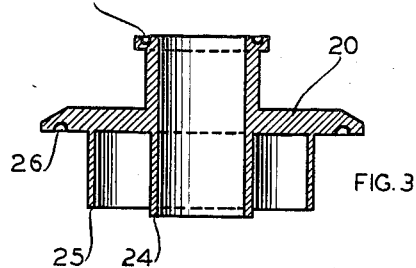
Figure 4:
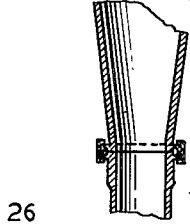
Figure 4 illustrates the elbow connector which leads into the side wall of the large defoaming conduit and which elbow connects with the small vacuum conduit leading from the top of the milk bottles or cartons which are being filled and which conduit draws the foam away from the cartons or bottles being filled and delivers the foam into the large defoaming conduit.

Leading from the top of the bottles or cartons being filled, I provide a vacuum conduit 11 which extends vertically and is connected by the elbow 12 to a horizontal section 13 of the vacuum conduit. The section 13 of the vacuum conduit is connected at 14 to an elbow 15 leading into the large defoaming conduit 10 illustrated in dotted lines in Figure 2. The elbow 15 has its outlet end 15' directed downward which causes the foam from the milk drawn by the conduit 11 to be directed downwardly in the large defoaming conduit 10.

When the foam from the milk enters the defoaming conduit 10, it starts to condense into liquid milk which is adapted to run down the defoaming conduit 10 and is carried by the funnel sectional end thereof 16 to the milk return elbow 18 which is connected on its lower end to the milk feeding tube 19 which leads to the filling apparatus which fills the bottles or cartons as they pass through the filling machine.

The defoaming conduit 10 is equipped with a top cover section 20 which is clamped to the top of the conduit 10 and is connected by an elbow 21 to an elbow 22 which in turn is connected to the vertical conduit 23 which leads to the vacuum pump (not illustrated).

The cover section 20 is formed with an inner depending tubular flange 24 and concentric therewith. I provide a depending tubular flange 25 surrounding the flange 24. The flanges 24 and 25 constitute drip flanges within the top of the defoaming tube 10, and these flanges act as a means of collecting any of the milk which has condensed within the defoaming conduit 10 and which may have crawled up the wall thereof and onto these drip flanges 24 and 25. The defoaming conduit 10 is long and extends vertically so that the action of gravity helps to collect and return to the filling apparatus virtually all of the condensed milk which has entered the defoaming conduit in the form of milk foam.

My defoamer A is very efficient in collecting and condensing the milk which has been drawn off from the filling apparatus from the vacuum conduit so that a very material saving of milk is accomplished in the use of my defoamer A. The defoamer A is formed in the various sections as heretofore set forth including the large defoaming conduit 10 and the respective parts such as the elbows and conduits of the vacuum lines which are all in sections. The sections of the defoamer are adapted to be connected by circular gaskets which fit into the respective grooves 26 and a circular band like cam operated clamp 27. At each of the joints of the various sections the clamps 27 are employed to lock the sections of my defoamer firmly together. I have designed my defoamer in sections so that it may be readily taken apart and sterilized when it is desired to clean the defoamer A. Furthermore, the sections provide a simple means of connecting the parts together and also give free access to the inner surface of these parts to facilitate cleansing of the same. The defoamer A is readily assembled so that the operator of the milk filling machine may quickly attach the defoamer to the same.

It is also a feature to provide a defoamer which is completely sealed from the outer atmosphere and which does not require any special attention by the operator of the milk filling machine, and at the same time the operator is assured that no milk will be wasted during the filling operation of the bottles and milk cartons.

While the drawings illustrate a milk bottle and carton filling machine to which I have attached my defoamer means, it will be apparent that a similar defoamer may be used on any liquid filling machine where a foam is inclined to build up on top of the container being filled. It will also be apparent that the defoamer A will act on any liquid filling machine of the above character to draw the foam away from the container being filled and to condense the same in the defoamer conduit 10 and collect the liquid from the condensed foam so that it may be readily directed back to the point of filling the containers.

The foam on milk and other liquids which readily build up a foam when being filled into a container is light in weight so that it can be readily drawn away by a vacuum through the conduit 11 and cause the foam to enter the defoaming conduit 10 where it is condensed into liquid and directed back into the filling station.

I claim:

1. In combination with a milk filling machine for bottles and cartons, a milk defoamer system including a sectionally connected series of vacuum conduit means connected to a vacuum means to apply a vacuum at the filling means of the filling machine, a defoaming means interposed in said vacuum conduit means, including a large vertically disposed defoaming conduit, said vacuum conduit means extending out of the top of said large defoaming conduit and leading to the vacuum means, a cover for said large defoaming conduit having a series of concentric drip flanges formed on the inner surface thereof, a feed elbow projecting in and connected to the wall of said large defoaming conduit having an inner downwardly depending drip end adapted to connect the vacuum conduit means from the milk filling means to draw the foam of the milk therefrom and deposit it in said large defoaming conduit, and a liquid milk collecting section attached to the lower end of said large defoaming conduit and adapted to direct the liquid milk which has been collected by said defoaming means back to the filling means of the milk filling machine.

2. A defoaming device for machines adapted to fill milk bottles and cartons with milk, including a foam collecting head in the filling means of the machine, vacuum conduit means leading from said head, a vertically disposed defoaming chamber, a feeding elbow having a depending inner end forming a drip means connecting said vacuum conduit means to said defoaming chamber near the upper end thereof, vacuum conduit means leading from the top of said defoaming chamber and connected to a vacuum means, concentric drip flanges formed on the top section of said defoaming chamber, tubular sections connected to the bottom of said defoaming chamber adapted to return the defoamed milk to the milk filling means of the filling machine.

3. A defoamer in combination with a milk filling machine having milk filling means, a vertically disposed defoaming chamber, a cover on the top of said defoaming chamber having a series of inter-concentric depending drip flanges, a feed elbow extending into one side of the defoaming chamber having a depending end adapted to act as a drip flange means, a liquid milk collecting section secured to the bottom of said defoaming chamber, tubular means extending from said collector section of the defoaming chamber leading back to the milk filling means of said machine, sectional tubular means connecting said elbow leading into said defoaming chamber with the milk filling means of said machine adapted to collect the foam from the filling means and introduce the same into said defoaming chamber, tubular means connected to the top cover of said defoaming chamber and leading to a vacuum means whereby said defoaming means will cause the foam drawn from the filling means to be condensed and returned to the filling station in liquid milk without appreciable loss of any milk in the filling of bottles and cartons and keeping the filling means of said filling machine clean and free of milk foam.

4. A defoamer for liquid filling machines and the like wherein the liquid is inclined to build up a foam at the filling means of the filling machine, comprising vacuum means, sectional tubular means connecting said vacuum means with said filling means of said machine to draw the foam from the liquid away from the filling means, a defoaming chamber interposed between said filling means and said vacuum means in said tubular sectional means, adapted to be positioned vertically, liquid drip flanges formed within said defoaming chamber therein a depending elbow member extending into said chamber and connecting said tubular means to said chamber, the foam drawn from said filling means and directed into said defoaming chamber being condensed into liquid form and tubular sectional means connecting the bottom of said defoaming chamber with the filling means of said machine to return the liquid from the defoamer chamber to the filling means.

5. The combination of a liquid filling machine adapted to dispense liquid which is inclined to foam at the filling means and a defoaming means including a vacuum conduit means leading from said filling means to a remotely disposed vacuum means, an enlarged elongated cylindrical chamber interposed in said vacuum conduit means between the foam receiving end and the source of vacuum adapted to cause a vertically extended area of sudden reduction in air pressure in said chamber causing foam entering the same to condense into liquid, drip flange means within said defoaming chamber and a liquid draining end member at the bottom of said enlarged chamber adapted to direct collected liquid from the same to be carried back to said filling means.

6. A defoamer for a milk filling machine, with filling means for milk bottles or cartons, and a milk reservoir, comprising, conduit means connecting the said filling means to a remote vacuum means, including a first conduit means having one end thereof adapted to be connected to the tops of the bottles through said filling means, a large vertically disposed defoaming tube having an upper end and a lower milk collecting end, apertured cover means at said upper end, a second conduit means connecting said cover means to said vacuum source, a defoaming elbow connecting the other end of the first conduit means to said defoaming tube and projecting into said defoaming tube through the side thereof at a point intermediate its ends, and return conduit means connected at one end to said milk collecting end of the defoaming tube and adapted to be collected at its other end to said filling means, said cover means having a series of depending drip flanges projecting downwardly into said defoaming tube.

7. A defoamer for a liquid dispensing machine, having filling means for bottles or cartons, and a liquid reservoir, comprising conduit means connecting the said filling means to a remote vacuum means, including a first conduit means having one end thereof removably connected to the tops of the bottles through said filling means, a large vertically disposed defoaming tube having an upper end and a lower liquid collecting end, apertured cover means at said upper end, a second conduit means connecting said cover means to said vacuum means, a defoaming elbow connecting the other end of the first conduit means to said defoaming tube and projecting into said defoaming tube through the wall thereof at a point intermediate its ends, return conduit means connected at one end to said liquid collecting end of said defoaming tube and connected at its other end to said filling means, and a series of depending drip flanges formed within said defoaming machine.

References Cited in the file of this patent

UNITED STATES PATENTS

| | | |
|---|---|---|
| 1,697,201 | Muller | Jan. 1, 1929 |
| 2,203,388 | Kantor | June 4, 1940 |
| 2,753,098 | Ward | July 3, 1956 |